United States Patent
Willemsen

(10) Patent No.: US 7,101,168 B1
(45) Date of Patent: Sep. 5, 2006

(54) RELEASING UNDERCUT MOULDED CONTAINERS AFTER A THERMOFORMING PROCESS

(75) Inventor: Louis R. H. A. Willemsen, Muntinlupa (PH)

(73) Assignee: Weasy Pack International Ltd., (MY)

( * ) Notice: Subject to any disclaimer, the term of this patent is extended or adjusted under 35 U.S.C. 154(b) by 0 days.

(21) Appl. No.: 10/070,390

(22) PCT Filed: Sep. 8, 2000

(86) PCT No.: PCT/NL00/00632

§ 371 (c)(1),
(2), (4) Date: Jul. 9, 2002

(87) PCT Pub. No.: WO01/17753

PCT Pub. Date: Mar. 15, 2001

(30) Foreign Application Priority Data

Sep. 8, 1999 (NL) ..................................... 1013002

(51) Int. Cl.
   *B29C 51/44* (2006.01)
(52) U.S. Cl. ...................... 425/388; 425/397; 425/422; 425/466; 249/76; 249/136; 249/161
(58) Field of Classification Search .............. 425/388, 425/397, 407, 422, 441, 466; 249/136, 161, 249/74, 76
   See application file for complete search history.

(56) References Cited

U.S. PATENT DOCUMENTS

| | | | | |
|---|---|---|---|---|
| 3,259,942 A | | 7/1966 | Politis | |
| 3,964,237 A | * | 6/1976 | Johansen | 425/388 |
| 4,609,339 A | * | 9/1986 | Padovani | 425/383 |
| 4,755,128 A | * | 7/1988 | Alexander et al. | 425/292 |
| 4,859,170 A | * | 8/1989 | Aoki | 425/450.1 |
| 5,219,594 A | * | 6/1993 | Meyer et al. | 425/451.5 |
| 6,099,785 A | * | 8/2000 | Schweigert et al. | 249/59 |
| 6,324,819 B1 | | 12/2001 | Kourtoglou | |

FOREIGN PATENT DOCUMENTS

| | | |
|---|---|---|
| DE | 19706797 A | 8/1998 |
| GB | 1205694 A | 9/1970 |
| JP | 06-315977 A | 11/1994 |

* cited by examiner

*Primary Examiner*—Duane Smith
*Assistant Examiner*—Thu Khanh T. Nguyen
(74) *Attorney, Agent, or Firm*—Banner & Witcoff, Ltd.

(57) ABSTRACT

The invention relates to a device for forming a number of thin-walled objects by means of a blow-moulding process from a layer of material which is deformable when heated, comprising: a lower mould with cavities (6) arranged therein, wherein the shape of each of the cavities (6) corresponds with the external shape of the objects to be formed; means for carrying the layer of material to be moulded onto the lower mould; supply means for supplying gas to the upper side of the lower mould; heating means for heating the lower mould; and mandrels movable into the cavities, wherein the lower mould is divided into a number of segments (5), wherein a number of segments (5) is placed around each cavity and the segments are movable in substantially radial direction between a first position, in which they form the wall of the cavity enclosed by the segments (5), and a second position in which an object (19) formed in the cavity can be moved out of the mould.

7 Claims, 3 Drawing Sheets

RELEASING UNDERCUT MOULDED CONTAINERS AFTER A THERMOFORMING PROCESS

CROSS REFERENCE TO RELATED APPLICATIONS

This is a U.S. National Phase Application under 35 U.S.C. § 371 and applicant herewith claims the benefit of priority of PCT/NL00/00632 filed Sep. 8, 2000, which was published Under PCT Article 21(2) in English, which claims priority to NL Patent Application No. 1013002, filed Sep. 8, 1999, the entire contents of which are incorporated herein by reference.

FIELD OF THE INVENTION

The invention relates to a device for forming a number of thin-walled objects by means of a blow-moulding process from a layer of material which is deformable when heated, comprising:

a lower mould with cavities arranged therein, wherein the shape of each of the cavities corresponds with the external shape of the objects to be formed;

means for carrying the layer of material to be moulded onto the lower mould;

supply means for supplying gas to the upper side of the lower mould;

heating means for heating the lower mould; and mandrels movable into the cavities.

BACKGROUND OF THE INVENTION

Such devices are generally known. They are used to form products such as containers for coffee milk, yoghurt, salads and numerous other products by a blow-moulding process. Used as a starting point here is a thin layer of material which is deformable when heated and which is pushed fixedly into the cavity by means of compressed air, or pressurized air, is there cooled, whereby the shape is retained, and the completed product is then transported away.

The fact that product which is to a certain degree form-retaining must be removed from the mould imposes limitations in the prior art on the shape of the product.

BRIEF DESCRIPTION OF THE INVENTION

There is however a need for more freedom in the choice of the shape of the product in order for instance to provide the product with additional functions.

The present invention therefore has for its object to provide such a device which is suitable for manufacturing shapes which in the prior art cannot be released from the mould.

This objective is achieved in that the lower mould is divided into a number of segments, wherein a number of segments is placed around each cavity and the segments are movable in substantially radial direction between a first position, in which they form the wall of the cavity enclosed by the segments, and a second position in which an object formed in the cavity can be moved out of the mould.

The mobility of the segments between a first position, in which the moulding process takes place, and a second position, in which the rigid product can be removed from the mould, results in a greater freedom in choosing the shape of the products for finishing.

It is herein noted that it is indeed known in injection mould production to use divisible moulds. Injection moulding is however a process wherein there is greater freedom and a much greater space is available for allowing movement of segments of the mould. In blow-moulding this is not the case; the blow-moulding process limits the mobility of the mould to a great extent; as a result of the process, blow-moulded products are manufactured adjacently of each other, i.e. all with their upper surface in the same plane, wherein the movements of the mould, which in the process in question is usually designated as lower mould, under the relevant plane are limited. It has therefore been assumed heretofore that it is impossible to provide a device for the blow-moulding process wherein the moulds are divisible for release of the finished product.

Certainly where small products are manufactured a blow mould will contain a relatively large number of cavities, so that the problem is made even more difficult.

According to another embodiment each cavity is enclosed by at least three segments wherein the separating planes between the segments extend substantially perpendicularly of the upper surface of the lower mould, and each of the segments is drivable for movement between the first and second position by a drive member.

Geometric considerations indicate the attraction of this embodiment; the distance between the first and the second position of the segments is limited, while sufficient freedom for release of the mould is still obtained.

According to an attractive embodiment each cavity is enclosed by four segments, wherein each of the segments is drivable by a linear drive member. The use of four segments results in a structure of paths extending perpendicularly of each other, which is structurally attractive.

When the four segments, which are situated in closer proximity to each other in the second position than in the first position, are coupled to a common drive element, there is a resulting simplification since the number of drive elements is reduced.

According to a particularly attractive embodiment the common drive element is adapted to execute a movement in a direction perpendicular to the direction of movement of the segments, and the common drive element is connected to the four segments by means of a coupling converting the direction of movement.

This configuration is particularly attractive structurally; a common drive element can be used to cause a movement in four different directions.

An even more attractive embodiment results when the coupling comprises four prismatic pins, each extending at the same angle relative to the direction of movement of the drive element, and the segments each comprise a channel into which the pins fit and the axis of which corresponds with the axis of the pins.

Provided this construction is manufactured with a sufficiently small tolerance, a structurally very simple configuration results.

Other attractive embodiments are specified in the remaining sub-claims.

BRIEF DESCRIPTION OF THE DRAWINGS

The present invention will be elucidated hereinbelow with reference to the annexed figures, in which.

DETAILED DESCRIPTION OF THE INVENTION

Figure 1:
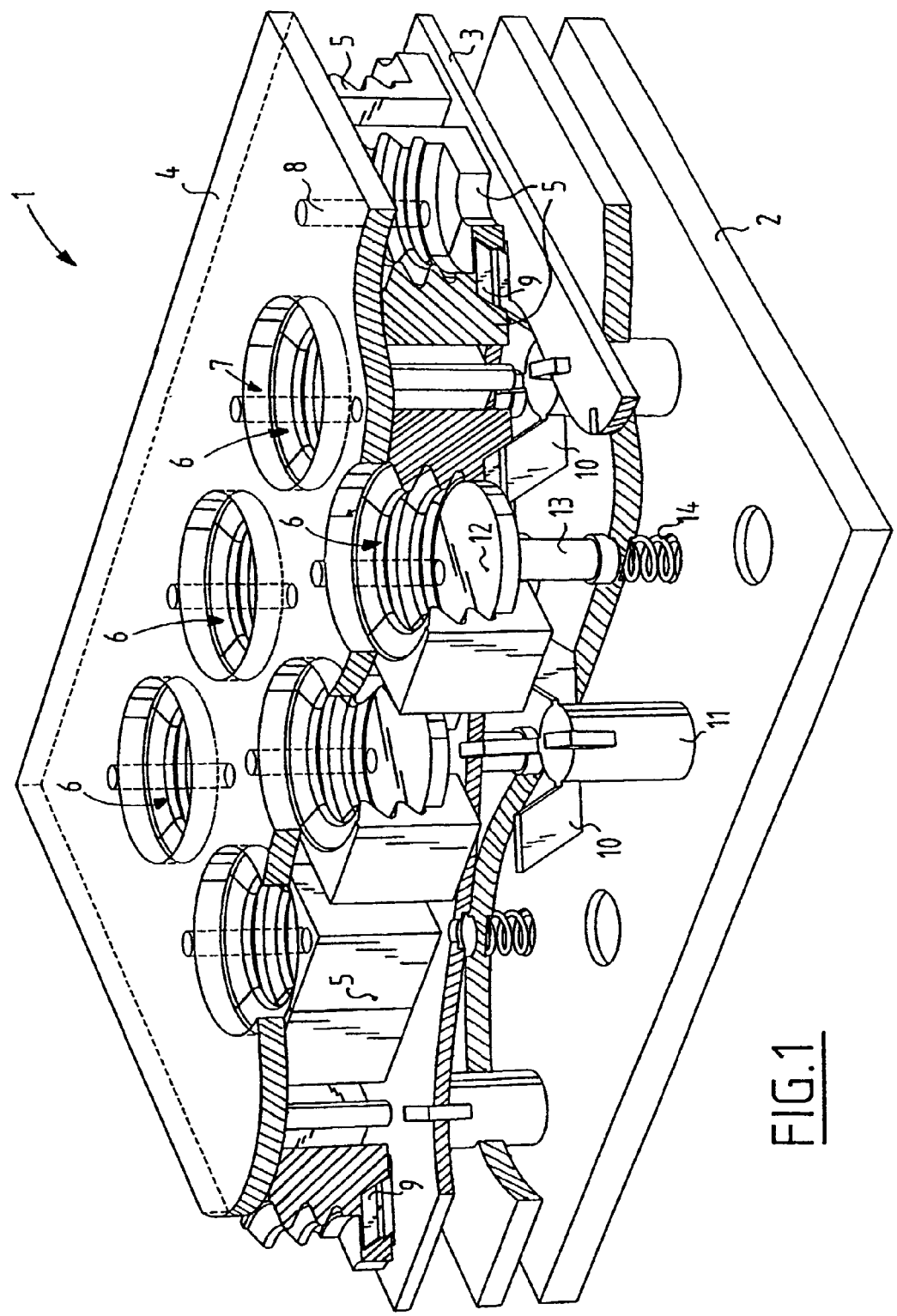
FIG. 1 is a partly broken-away perspective view of a first embodiment of a device according to the present invention in a first position of the segments.

FIG. 1 shows a mould which is designated as a whole with 1. The lower mould is formed by a base plate 2, an intermediate plate 3 and a top plate 4. A large number of segments 5 is arranged between top plate 4 and intermediate plate 3. Segments 5 are herein grouped around cavity 6.

In the present embodiment five segments are arranged around each cavity 6. The cavities correspond with relevant holes 7 arranged in top plate 4. Intermediate plate 3 and top plate 4 are mutually connected by connecting elements 8. Connecting elements 8 are placed such that they do not obstruct the movements of segments 5.

Figure 2:
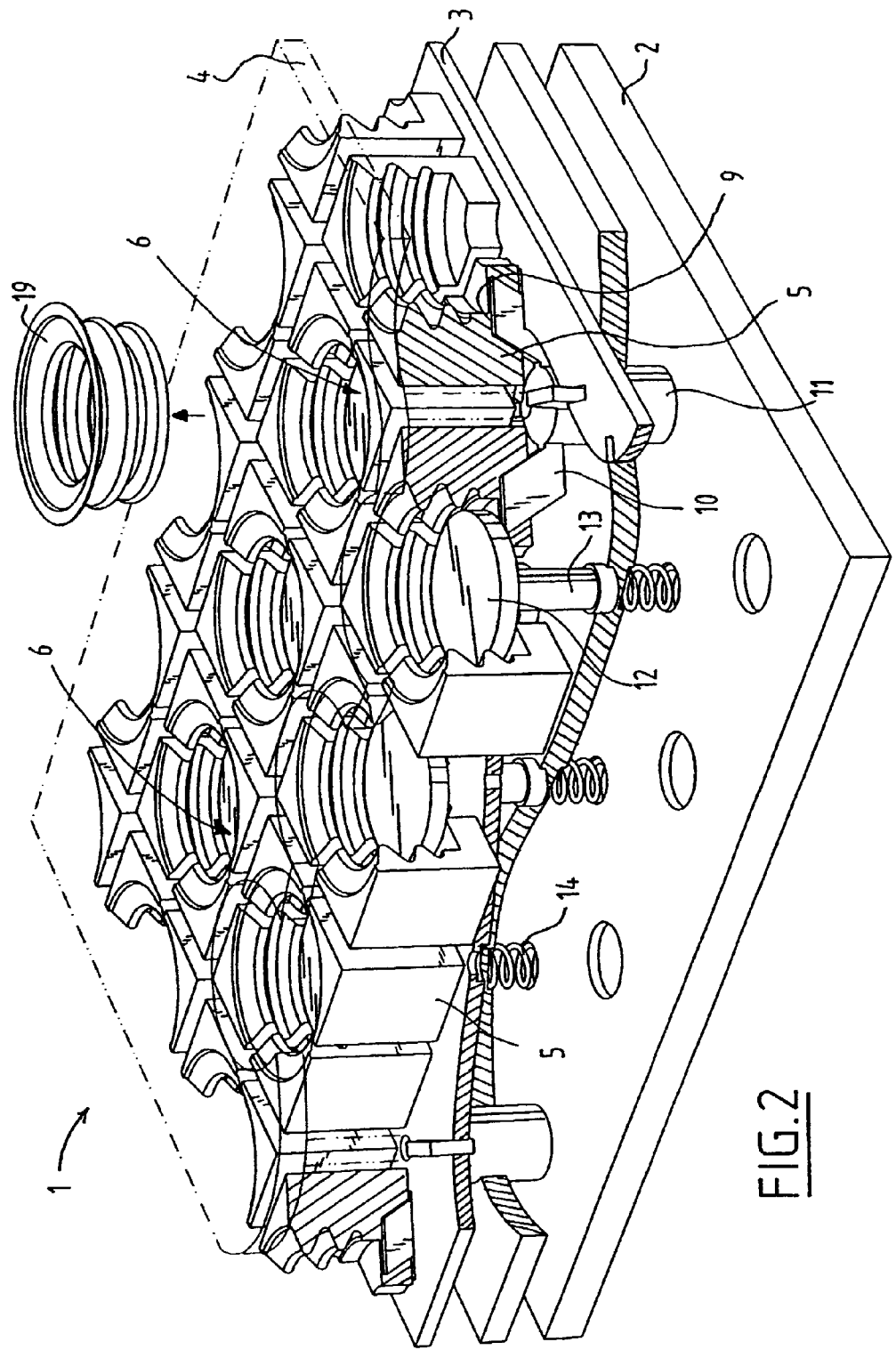
FIG. 2 is a view corresponding to FIG. 1 wherein the segments are situated in the second position.

Channels 9 are arranged in segments 5 in order to drive segments 5 between the first position shown in FIG. 1, in which the forming of the product can take place, and the position shown in FIG. 2 in which the product can be released from the moulds. Extending in the channels are pins 10, which are drawn in the present case with a rectangular cross-section but which may equally be embodied round, for instance with the shape of a circular cylinder. Essential here is that they fit precisely into channels 9.

The pins 10 are all connected to a cylinder 11. Each of the cylinders 11 is connected to base plate 2. By moving base plate 2 up or downward, the segments are therefore moved between their first position, shown in FIG. 1, and second position, shown in FIG. 2.

It will be apparent that it is possible to employ other forms of drive, for instance an individual drive element instead of each of the cylinders 11. It is also possible to make use of other types of drive element, for instance lever systems or of systems provided with profiled cam discs.

It will of course be apparent that a form of drive must be chosen which fits into the limited space available.

This embodiment also has ejector elements. The ejector elements are formed by stamps 12 which are provided on their underside with a pin 13, wherein a spring 14 is arranged between the underside of pin 13 and base plate 2. When plate 2 is moved upward in order to carry segments 5 from the first position to the second, release position, spring 14 will be compressed, whereafter stamp 12 will press out the product when the release position is reached.

This latter measure is however not specifically necessary for applying of the present invention, it merely forms an attractive additional measure.

FIG. 2 shows how segments 5 are situated in their release position; protruding edges of the formed product do not represent problems here, thus resulting in a greater freedom in the design of products to be manufactured by this device.

It is noted herein that in the present embodiment there is a division into four segments. It is of course possible to make use of other numbers of segments. In order to keep the drive as simple as possible, the aim will be a small number of segments, thus for instance two. In many cases, however, sufficient freedom is not obtained herewith for release of the formed products. Four is found to be an attractive number of segments.

Figure 4:
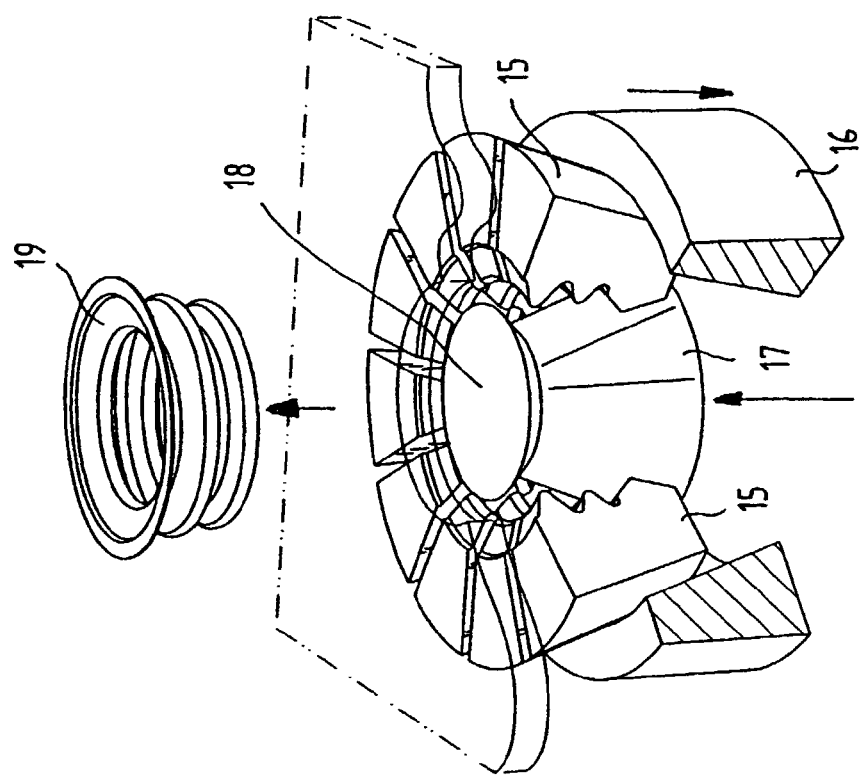
FIG. 4 shows a view corresponding to FIG. 3 wherein the segments are situated in the second position.
Figure 3:
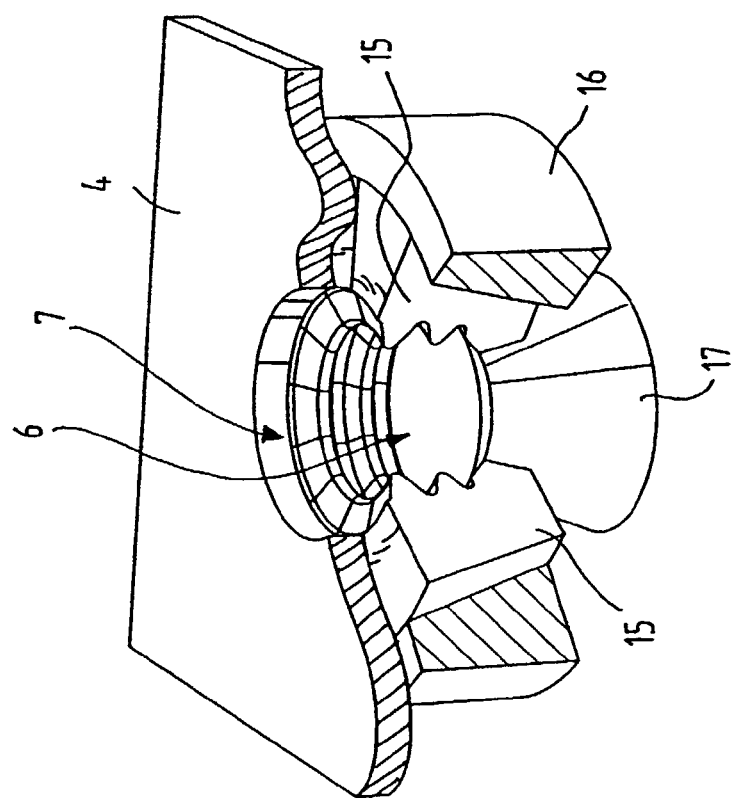
FIG. 3 shows a partly broken-away perspective view of a second embodiment of a device according to the present invention.

As shown in FIGS. 3 and 4, it is also possible to make use of a much larger number of segments. Use is made herein of a certain form of circle symmetry, so that despite the large number of segments use can be made of a simple drive. FIG. 3 thus shows a top plate 4 in which a hole 7 is arranged, below which a cavity 6 is situated. Cavity 6 is enclosed by twelve segments 15 which are conical on their outside. These are enclosed by a ring 16 which is conical on its inner side. Ring 16 is movable in vertical direction, whereby segments 15 are moved toward each other into the position shown in FIG. 3.

When ring 16 is then moved downward as shown in FIG. 4, segments 16 are able to move outward. In the embodiment shown in FIGS. 3 and 4 the outward movement is achieved in that the segments are also provided on their inner side with a conical edge which is urged outward by a conical body 17 when this conical body 17 moves upward. It is of course a prerequisite here that the movements of conical body 17 and ring 16 are synchronized. Conical body 17 is further provided on its top with a stamp 18 for pressing out the finished product 19.

It will be apparent that other constructions can also be applied in the case of a large number of segments 15, for instance a construction wherein each of the segments 15 is urged inward or outward by means of a spring, and wherein the urging force in question is counteracted by a movement of a body.

The number of segments can of course also be greatly changed.

The invention claimed is:

1. Device for forming a number of thin-walled objects by means of a thermoforming process from a layer of material which is deformable when heated, comprising:

a mold with cavities arranged therein, wherein an internal shape of each of the cavities corresponds with an external shape of an object to be formed in each cavity; and means for carrying the layer of material to be molded onto the mold;

wherein the cavities are each enclosed by a cavity wall which is divided into wall segments;

wherein the wall segments are movable in a linear direction between a first position, in which they enclose the cavity and a second position in which an object formed in the cavity is released; and wherein the wall segments of each cavity are coupled to a linear drive member, wherein the linear drive member executes a linear movement in a direction substantially perpendicular to a direction of movement of the wall segments, wherein the linear drive member is connected to the segments by means of a coupling converting said linear direction of movement of the drive member to the movement of the wall segment in a substantially perpendicular direction, wherein the drive member extends substantially in a space underneath the cavity, and wherein the coupling comprises prismatic pins, each pin extending at the same angle relative to the direction of movement of the linear drive member, and wherein the segments each comprise a channel receiving one of the prismatic pins, a longitudinal axis of the channel extending in substantially a same direction as a longitudinal axis of the pin,.

2. Device as claimed in claim 1, wherein the linear drive member extends in the vertical direction.

3. Device as claimed in claim 1, wherein the mold comprises a plate which engages the wall segments; wherein the plate has guide means for guiding the wall segments when they execute their movement between the first position and the second position.

4. Device as claimed in claim 2, further comprising a stamp arranged in each of the cavities wherein the stamp is movable in vertical direction to eject an object formed in each cavity.

5. Device as claimed in claim 4, wherein the stamp of a cavity is coupled to the drive element of that cavity.

6. Device as claimed in claim 1 wherein each cavity is enclosed by at least three segments wherein separating planes between the segments extend substantially perpendicularly of the upper surface of the mold, and each of the segments is movable between the first and second position by the linear drive member.

7. Device as claimed in claim 6, wherein each cavity is enclosed by four segments, wherein each of the segments is movable by the linear drive member.

* * * * *